(12) United States Patent
Yamada et al.

(10) Patent No.: US 8,825,647 B2
(45) Date of Patent: Sep. 2, 2014

(54) COMMUNICATION TERMINAL, INFORMATION MANAGEMENT APPARATUS, AND PROGRAM

(75) Inventors: Eiju Yamada, Yokohama (JP); Kazuhiro Yamada, Yokohama (JP); Dai Kamiya, Tokyo (JP); Yasushi Onda, Tokyo (JP); Izua Kano, Yokohama (JP); Keiichi Murakami, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 197 days.

(21) Appl. No.: 12/670,155

(22) PCT Filed: Jul. 24, 2008

(86) PCT No.: PCT/JP2008/063269
§ 371 (c)(1),
(2), (4) Date: Jun. 3, 2010

(87) PCT Pub. No.: WO2009/014170
PCT Pub. Date: Jan. 29, 2009

(65) Prior Publication Data
US 2011/0276571 A1    Nov. 10, 2011

(30) Foreign Application Priority Data

Jul. 24, 2007    (JP) ................ 2007-192370

(51) Int. Cl.
*G06F 17/30*    (2006.01)
*H04M 1/2745*    (2006.01)
*H04M 1/725*    (2006.01)

(52) U.S. Cl.
CPC .. *H04M 1/274583* (2013.01); *H04M 1/274508* (2013.01); *H04M 1/72572* (2013.01); *H04M 2250/10* (2013.01)
USPC ........................................ 707/737

(58) Field of Classification Search
CPC ................................ G06F 17/30035
USPC ............................................ 707/737
See application file for complete search history.

(56) References Cited

U.S. PATENT DOCUMENTS 5,625,886 A * 4/1997 Raes .............................. 455/519
8,234,272 B2 * 7/2012 Kretz et al. ................... 707/723

(Continued)

FOREIGN PATENT DOCUMENTS

JP        07274253        10/1995
JP        2000165501       6/2000

(Continued)

OTHER PUBLICATIONS

European Patent Application No. 08791521.1; Supplementary European Search Report dated Feb. 1, 2012.

(Continued)

*Primary Examiner* — Sheree Brown
(74) *Attorney, Agent, or Firm* — MKG, LLC

(57) ABSTRACT

A terminal device in which basic information and detailed information of each a plurality of application programs are stored in a different storage area for each application program, and that prohibits access to each storage area by other application programs, is caused to execute the processes of displaying a window that includes the basic information of each application program, and, if a cursor is moved to the display position of one of the pieces of basic information, reading out, from the appropriate storage areas, the detailed information of a first application program corresponding to the basic information where the cursor is positioned and the detailed information of a second application program whose basic information is displayed adjacent to the basic information of the first application program, and displaying the detailed information of the first application program.

12 Claims, 8 Drawing Sheets

(56) References Cited

U.S. PATENT DOCUMENTS

| | | | |
|---|---|---|---|
| 8,417,675 B2* | 4/2013 | Eldering et al. | 707/694 |
| 8,606,923 B2* | 12/2013 | Tekwani | 709/226 |
| 2004/0254723 A1* | 12/2004 | Tu | 701/209 |
| 2005/0114021 A1* | 5/2005 | Krull et al. | 701/211 |
| 2006/0223518 A1* | 10/2006 | Haney | 455/420 |
| 2008/0133580 A1 | 6/2008 | Wanless et al. | 707/102 |
| 2008/0192589 A1* | 8/2008 | Lin et al. | 369/44.23 |
| 2008/0227473 A1* | 9/2008 | Haney | 455/457 |
| 2008/0275865 A1* | 11/2008 | Kretz et al. | 707/5 |
| 2008/0280600 A1* | 11/2008 | Zhou | 455/415 |
| 2009/0024765 A1* | 1/2009 | Luers | 710/9 |
| 2009/0177384 A1* | 7/2009 | Walder | 701/208 |
| 2009/0191898 A1* | 7/2009 | Lewis et al. | 455/456.3 |
| 2010/0330972 A1* | 12/2010 | Angiolillo | 455/418 |
| 2012/0050032 A1* | 3/2012 | Hough | 340/539.13 |
| 2012/0066393 A1* | 3/2012 | Tekwani | 709/226 |
| 2012/0150960 A1* | 6/2012 | Nalawade | 709/204 |

FOREIGN PATENT DOCUMENTS

| | | |
|---|---|---|
| JP | 2003259011 | 9/2003 |
| JP | 2003283637 | 10/2003 |
| JP | 2005109896 | 4/2005 |
| JP | 2006050266 | 2/2006 |
| JP | 2006319454 | 11/2006 |
| JP | 2007318441 | 6/2007 |
| WO | 2007008761 A1 | 1/2007 |
| WO | 2007063499 A1 | 6/2007 |

OTHER PUBLICATIONS

Notification of Reasons for Rejections for JP Application No. 2007-192370, mailed Sep. 4, 2012.

Office Action from corresponding Japanese Application No. 2007-192370 dated Mar. 19, 2013.

Office Action for corresponding Chinese application 200880100122.0 dated May 30, 2013.

Office Action from corresponding Chinese Patent Application No. 200880100122.0 dated Dec. 4, 2013, with English translation.

* cited by examiner

FIG. 3

| NAME<br>(IDENTIFICATION NAME) | TELEPHONE NUMBER<br>(COMMUNICATION ADDRESS) | CATEGORY | |
|---|---|---|---|
| TARO YAMADA | 090-1111-1111 | COLLEAGUES | 16a |
| ICHIRO NAKAMURA | 090-××××-○○○× | COLLEAGUES | |
| YOSHIKO KIMURA | 090-××××-○○×× | FRIENDS | |
| KAZUO MITANI | 090-××××-○○×× | FAMILY | |
| ..... | ..... | ..... | |
| ..... | ..... | ..... | |

FIG. 4

| TELEPHONE NUMBER | MEASUREMENT DATE/TIME | POSITION | DISTANCE |
|---|---|---|---|
| 090-1111-1111 | 2006/4/1/8:00 | LATITUDE AA DEGREES NORTH, LONGITUDE BB DEGREES EAST | 5km |
| | 2006/4/1/12:00 | LATITUDE AA DEGREES NORTH, LONGITUDE BC DEGREES EAST | 10m |
| | 2006/4/1/16:00 | LATITUDE AA DEGREES NORTH, LONGITUDE BC DEGREES EAST | 120m |
| | 2006/4/1/20:00 | LATITUDE AA DEGREES NORTH, LONGITUDE BB DEGREES EAST | 5km |
| | ..... | ..... | ... |
| 090-xxxx-OOOx | 2006/4/1/8:00 | LATITUDE AA DEGREES NORTH, LONGITUDE BB DEGREES EAST | 2m |
| | 2006/4/1/12:00 | LATITUDE AA DEGREES NORTH, LONGITUDE BB DEGREES EAST | 5km |
| | 2006/4/1/16:00 | LATITUDE AA DEGREES NORTH, LONGITUDE BB DEGREES EAST | 5km |
| | 2006/4/1/20:00 | LATITUDE AA DEGREES NORTH, LONGITUDE BB DEGREES EAST | 3m |
| | ..... | ..... | ... |
| 090-xxxx-OOxx | 2006/4/1/8:00 | ..... | ... |
| | 2006/4/1/12:00 | ..... | ... |
| | 2006/4/1/16:00 | ..... | ... |
| ... | ... | ... | ... |

| FACILITY NAME | POSITION |
|---|---|
| AA SCHOOL | LATITUDE AA DEGREES NORTH, LONGITUDE BB DEGREES EAST |
| FIRE DEPARTMENT | LATITUDE AA DEGREES NORTH, LONGITUDE BC DEGREES EAST |
| A COMPANY | LATITUDE AA DEGREES NORTH, LONGITUDE BC DEGREES EAST |
| LIBRARY | LATITUDE AA DEGREES NORTH, LONGITUDE BB DEGREES EAST |
| BB STATION | LATITUDE AA DEGREES NORTH, LONGITUDE BB DEGREES EAST |
| ····· | ····· |
| ····· | ····· |
| ····· | ····· |

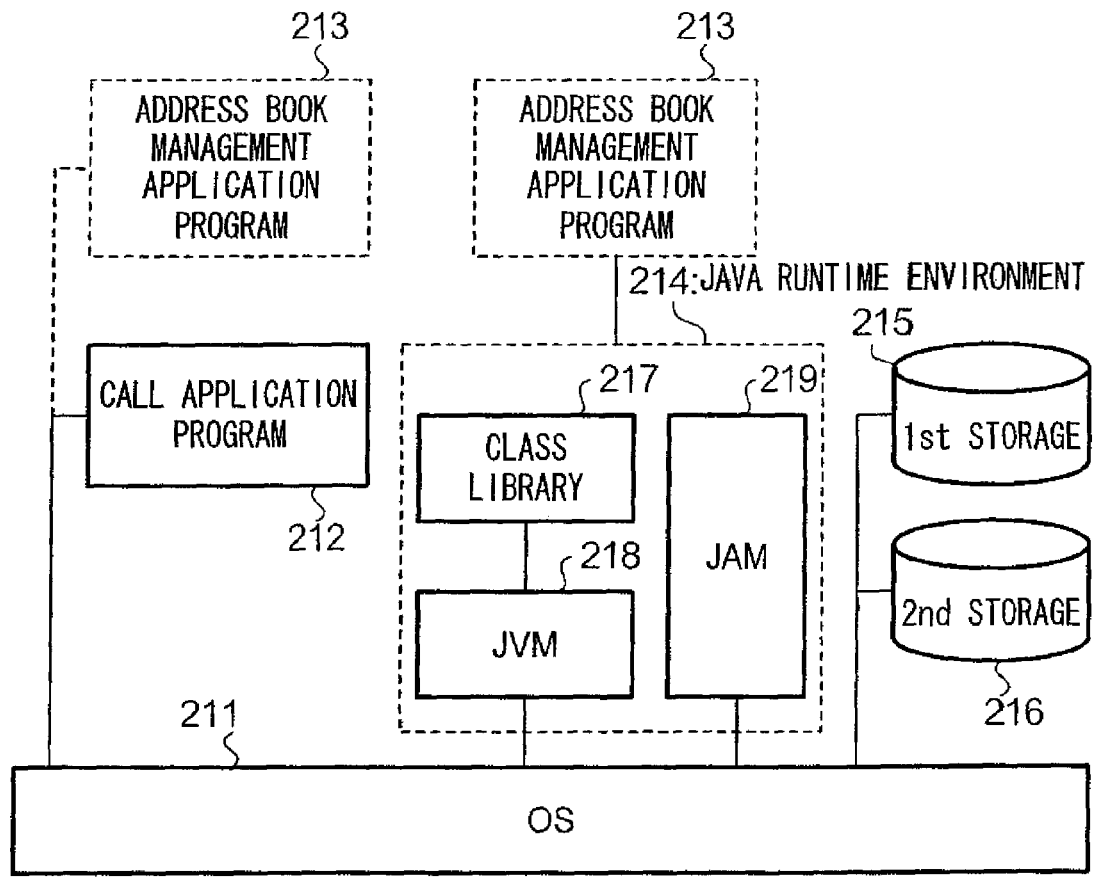

COLLEAGUES CATEGORY

1: TARO YAMADA
2: ICHIRO NAKAMURA
3: KEIKO YOSHIDA

FIG. 13

TARO
YAMADA 090-1111-1111

OUTGOING
CALL

COMMUNICATION TERMINAL, INFORMATION MANAGEMENT APPARATUS, AND PROGRAM

FIELD OF THE INVENTION

The present invention relates to a technique for managing information in which communication addresses allocated to communication terminals are paired with identification names for identifying users of the communication terminals.

BACKGROUND

Telephone terminals are generally provided with a function called an address book or a telephone book. This function (hereinafter, called an address book function) involves storing pairs of a "telephone number" which is a communication address allocated to each telephone terminal and a "name" which is an identification name of a user who uses the telephone terminal, and displaying these pairs as necessary. When a user uses this address book function to display the name of a desired callee on a telephone terminal and instruct the telephone terminal to make an outgoing call to the telephone terminal of the callee, the telephone terminal performs an outgoing call process based on the telephone number corresponding to the name. Such an address book function is, in most cases, implemented in a communication terminal capable of communicating with the callee by performing communication using some form of communication address, such as an e-mail terminal that transmits and receives e-mail messages, without being limited to a telephone terminal.

Incidentally, the address book function includes a function of registering telephone numbers in a number of categories (groups), such as "friends", "family", "colleagues", "work", and "associates", for example. However, because the operation of sorting telephone numbers into such categories is complicated, many users shy away from using this sorting-related function.

In patent document JP 2006-050266A, a proposal is made that involves inferring, based on a pre-registered schedule of a user and a call history of the user, the purpose of calls included in the call history, and sorting telephone numbers by the inferred purpose.

The present invention has been made in consideration of such a background, and has as its object to register pairs of communication addresses of communication terminals and identification names of users separately by group and display these pairs, while reducing the operation load of users.

SUMMARY OF THE INVENTION

In one aspect, the present invention resides in a communication terminal including communication means for using communication addresses respectively allocated to a plurality of communication terminals to communicate with the individual communication terminals and storage means for storing the communication addresses allocated to the individual communication terminals respectively in pairs with identification names for identifying users of the individual communication terminal. The communication terminal includes specifying means for specifying positions of the communication terminals to which the communication addresses stored in the storage means are allocated, or distances from the communication terminals and sorting means for sorting the pairs of communication addresses and identification names into a plurality of groups in accordance with a set algorithm, based on the positions or distances specified by the specifying means. The communication terminal also includes display control means for causing display means to display at least the identification names, out of the communication addresses and identification names stored in the storage means, by the groups sorted by the sorting means. In a particular embodiment, pairs of communication addresses of communication terminals and identification names of users can be stored separately by group and displayed, without users performing complicated operations. The communication means communicate wirelessly with a communication network. Also, the communication address, typically, is a telephone number for establishing a call line with a communication terminal or an e-mail address for exchanging e-mail messages with a communication terminal.

In a preferred embodiment of the present invention, the sorting means sorts the pairs of communication addresses and identification names into a plurality of groups, based on dates/times on which or periods for which the positions or distances were specified by the specifying means, in addition to the positions or distances. By thus sorting based on date/time or period, more accurate sorting can be anticipated.

In a different preferred embodiment, the sorting means sorts the pairs of communication addresses and identification names into a plurality of groups, and further determines, in each of the groups, a ranking for when the display means is caused to display the identification names, based on the positions or distances specified by the specifying means, and the display control means displays the identification names in accordance with the ranking determined by the sorting means, in a case of causing the display means to display at least the identification names, out of the communication addresses and identification names stored in the storage means, by the groups. A relationship between users using individual communication terminals can thereby be reflected in the order in which identification names are displayed.

Also, the sorting means may be configured to store types of facilities installed in a prescribed range in correspondence with positions of the facilities, specify the types of facilities installed in the positions specified by the specifying means, by comparing the positions specified by the specifying means with the positions of the facilities, and sort the pairs of communication addresses and identification names into a plurality of groups based on the specified types of facilities.

Also, the communication terminal may include operation means for receiving an operation by a user, and changing means for changing a group to which a pair of a communication address and an identification name sorted by the sorting means belong, in accordance with the operation received by the operation means, and the sorting means may be configured not to perform sorting based on the positions or distances specified by the specifying means, with regard to the pair of the address and the identification name whose group was changed by the changing means. In this way, even if the sorting by the sorting means is not in line with the user's intent, the sorting can be corrected as the user desires.

In another aspect, the present invention resides in an information management apparatus which includes storage means for storing communication addresses respectively allocated to a plurality of communication terminals respectively in pairs with identification names for identifying users of the individual communication terminals, specifying means for specifying positions of the communication terminals to which the communication addresses stored in the storage means are allocated, or distances from the communication terminals to a prescribed communication terminal, and sorting means for sorting the pairs of communication addresses and identification names into a plurality of groups in accordance with a set algorithm, based on the positions or distances specified by the specifying means, and causing the storage means to perform storage for each sorted group. According to this invention, pairs of communication addresses of communication terminals and identification names of users can be stored separately by group, without users performing complicated operations Note that the present invention may take the form of a program provided to a computer.

BRIEF DESCRIPTION OF DRAWINGS

FIG. 3 shows an example of the contents of an address book table stored by the mobile telephone terminal;

FIG. 4 shows an example of the contents of a measured value storage table stored by the mobile telephone terminal;

FIG. 5 shows an example of the contents of a facility database stored by the mobile telephone terminal;

FIG. 6 shows a software configuration in the mobile telephone terminal;

FIG. 12 shows an example of content displayed by the mobile telephone terminal; and FIG. 13 shows an example of content displayed by the mobile telephone terminal.

DETAILED DESCRIPTION

Figure 1:
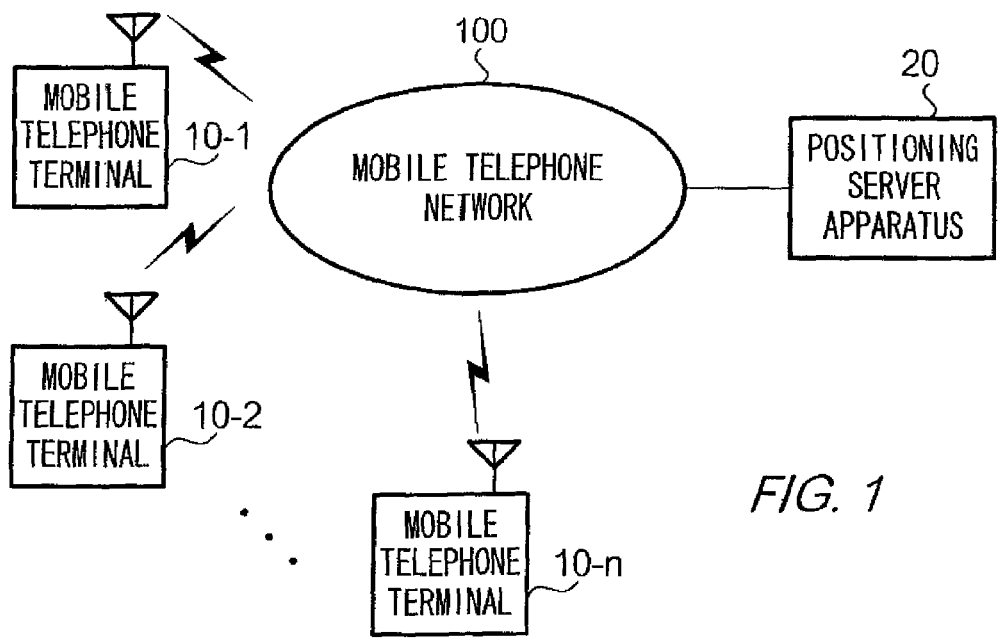
FIG. 1 is a block diagram showing an overall configuration of a system according to an exemplary embodiment of the present invention.

According to one aspect of the invention, the relationship between users who use individual communication terminals is inferred, based on the distances between communication terminals that are to communicate and the measurement dates/times or periods of those distances, or the positions of communication terminals to be communicated with and the measurement dates/times or periods of those positions, and the contents of an address book are sorted by category based on these inference results. The sorting algorithms are basically as follows.

(a) Sorting Algorithm Based on Distance Between Communication Terminals and Measurement Date/Time or Period Thereof Each communication terminal periodically, for example, measures the distances between itself and communication terminals registered in the address book thereof, and stores the distances obtained as a result in correspondence with the measurement dates/times. The communication terminal analyzes this stored content, and sorts the registered contents of the address book by category (group). For example, because of the high possibility of users who are in close proximity to one another always or for long periods being "family", which is the most intimate form of existence, such users are sorted into a "family" category. This involves sorting the categories based on the distance between communication terminals and the measurement period.

Also, because of the high possibility of users who are in close proximity only during weekday days belonging to the same organization such as a company, such users are sorted into a "colleagues" category. Also, because of users who are in close proximity only on weekday nights or holidays being in a relationship where they spend their free time together, such users are sorted into a "friends" category. This involves sorting the categories based on the distance between communication terminals and the measurement date/time.

(b) Sorting Algorithm Based on Position of Communication Terminals and Measurement Date/Time or Period Thereof Each communication terminal periodically, for example, measures the positions of communication terminals registered in the address book thereof, and stores the positions obtained as a result in correspondence with the measurement dates/times. The communication terminal analyzes this stored content, and sorts the registered contents of the address book by category. For example, because of the high possibility of users who are at home always or for long periods being "family", such users are sorted into the "family" category. This involves sorting the categories based on the position of the communication terminals and the measurement period.

Also, because of the high possibility of users who are at home during holidays and on weekday nights and at school during weekday days being "family", such users are sorted into the "family" category. This involves sorting the categories based on the position of the communication terminals and the measurement date/time. Also, because of the high possibility of users who are in a company during weekday days working at that company, such users are sorted into the "colleagues" category. This can be said to involve sorting the categories based on the distance between communication terminals and the measurement date/time.

FIG. 1 is a block diagram showing an overall configuration of a system according to an exemplary embodiment of the present invention. In FIG. 1, a mobile telephone network 100 is a PDC (Personal Digital Cellular) communication network, a GSM (Global System for Mobile Communications) communication network, or an IMT-2000 (International Mobile Telecommunication-2000) communication network. This mobile telephone network 100 is provided with multiple base stations and switching centers (not shown). Communication terminals such as mobile telephone terminals 10-1, 10-2 to 10-$n$ are communicably connected to this mobile telephone network 100 by wireless signals. Telephone numbers, which are communication addresses for invoking respective mobile telephone terminals, are allocated to the mobile telephone terminals 10-1, 10-2 to 10-$n$. The mobile telephone terminals 10-1, 10-2 to 10-$n$ are each able to initiate communication with each mobile telephone terminal designated a callee, using these telephone numbers, and establish a call line via the mobile telephone network 100. Users of the mobile telephone terminals 10-1, 10-2 to 10-$n$ thus converse with one another via the established call line. Also, a positioning server apparatus 20 is connected to the mobile telephone network 100. This positioning server apparatus 20 performs integrated management of information relating to the positions of the mobile telephone terminals 10-1, 10-2 to 10-$n$, and, in response to a request from a mobile telephone terminal, conveys positions managed thereby to the mobile telephone terminal that made the request.

Figure 2:
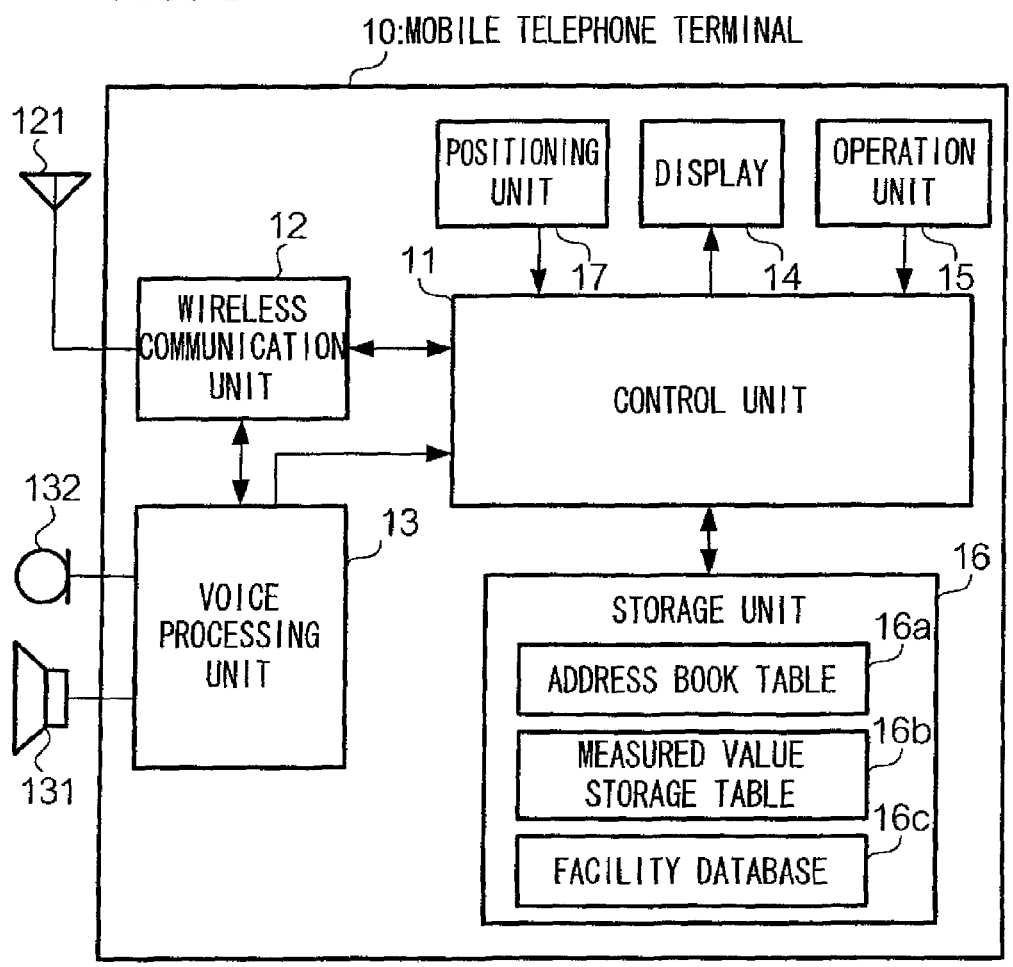
FIG. 2 is a block diagram showing a configuration of a mobile telephone terminal in the exemplary embodiment.

Note that because the multiple mobile telephone terminals 10-1, 10-2 to 10-$n$ all have the same configuration and operations, they are sometimes referred to collectively as "mobile telephone terminal 10" in the following description, when it is not necessary to distinguish one from another. FIG. 2 is a block diagram showing a configuration of the mobile telephone terminal 10.

As shown in FIG. 2, the mobile telephone terminal 10 is provided with a control unit 11, a wireless communication unit 12, a voice processing unit 13, a display 14, an operation unit 15, a storage unit 16, and a positioning unit 17. The control unit 11 is, for example, provided with a CPU (Central Processing Unit), a ROM (Read Only Memory), and a RAM (Random Access Memory), and controls the constituent elements of the mobile telephone terminal 10. The wireless communication unit 12 is provided with an antenna 121 and a wireless communication circuit (not shown). This wireless communication unit 12, on a wireless signal transmitted via a wireless channel from a base station of the mobile telephone network 100 being received by the antenna 121, demodulates the wireless signal after frequency conversion and A/D conversion by the wireless communication circuit, and further performs processing such as error correction decoding. Error correction decoded voice data is supplied to the voice processing unit 13, and undergoes D/A conversion and amplification, before being output as a reception voice from a speaker 131. On the other hand, the transmission voice of the user is converted to a transmission signal by being picked up by a microphone 132, and is converted to digital data after amplification and A/D conversion by the voice processing unit 13. The digital data undergoes echo cancelling and error correction encoding, and is further modulated and frequency converted, before being transmitted from the wireless communication unit 12 via the antenna 121 as a wireless signal.

The display 14 is, for example, provided with a liquid crystal display and a liquid crystal drive circuit, and displays various types of information, dialogue windows for the user, and the like, in response to instructions from the control unit 11. The operation unit 15 is, for example, provided with various types of keys such as an on-hook key and an off-hook key, apart from numeric keys "0" to "9", and supplies to control unit 11, a signal determined by an operation by the user. The control unit 11 executes processing that depends on an instruction by the user, based on this signal. The positioning unit 17 measures the position of the mobile telephone terminal 10 using any suitable positioning method to attained a predetermined accuracy. For example, position may be determined based on differences in the reception times of GPS signals transmitted from multiple GPS (Global Positioning System) satellites. This positioning unit 17 determines the position of the mobile telephone terminal 10, periodically or when there is a request from the positioning server apparatus 20.

The storage unit 16 is, for example, an EEPROM (Electrically Erasable and Programmable Read Only Memory) or a flash memory. This storage unit 16 stores an address book table 16a, a measured value storage table 16b, and a facility database 16c (discussed below), apart from storing various types of programs containing procedures for processing executed by the control unit 11 (CPU).

The address book table 16a contains identification names (e.g., personal names, organization names, pet names or nicknames) for identifying the users of the individual mobile telephone terminals 10-1, 10-2 to 10-n in correspondence with the telephone numbers allocated to each of the mobile telephone terminals 10-1, 10-2 to 10-n. FIG. 3 shows an example of the contents contained in this address book table 16a. As shown in FIG. 3, multiple pairs of the names (identification names) and telephone numbers (communication addresses) of users are contained in the address book table 16a, and these pairs are sorted into multiple predetermined categories. The types of categories include "family", "colleagues" and "friends", such as aforementioned, and the sorting criteria and category names are either freely decided by the user or predetermined at the point of manufacture of the mobile telephone terminal 10. In FIG. 3, the case where the pair of the name "Taro Yamada" and the telephone number "090-1111-1111" belongs to the "colleagues" category is illustrated.

The user, by operating the operation unit 15, causes the display 14 to display an address book registration window, and is able to input names, telephone numbers and the like, in accordance with guidance on this window. Also, in the case of viewing information registered in the address book table 16a, the user causes the display 14 to display an address book window by operating the operation unit 15, and causes the display 14 to display the telephone number of a desired user in accordance with guidance on this window. Further, the user can, by selecting the displayed telephone number, cause an outgoing call to be made to the mobile telephone terminal 10 of that telephone number. The user thus needs to input names and telephone numbers from the operation unit 15 and register them in this address book table 16a, but because the mobile telephone terminal 10 itself performs the required processing with regard to category sorting, the user does not need to perform operations relating to category sorting. Naturally, the user may correct or update the categories sorted by the mobile telephone terminal 10 himself or herself, using the operation unit 15.

The measured value storage table 16b contains the positions of the mobile telephone terminals 10 of the telephone numbers stored in the address book table 16a, in correspondence with the distances from the own terminal to these mobile telephone terminals 10 and the measurement dates/times. FIG. 4 shows an example of the contents contained in this measured value storage table 16b. In FIG. 4, the case is illustrated where, for example, the position of the mobile telephone terminal 10 to which the telephone number "090-1111-1111" is allocated is "latitude AA degrees north, longitude BB degrees east" at 8:00, Apr. 1, 2006, and distance to that mobile telephone terminal 10 is "5 km". The "positions" contained in the measured value storage table 16b are acquired by the mobile telephone terminal 10 from the positioning server apparatus 20. The "distances" are computed by the mobile telephone terminal 10 based on its own position and the positions acquired from the positioning server apparatus 20. Note that the method of expressing position may be a method of expression other than latitude and longitude.

The facility database 16c includes the names of facilities installed in a prescribed area such as the Kanto region or the Eastern Japan region, for example, and the positions of those facilities. FIG. 5 shows an example of the contents of this facility database 16c. In FIG. 5, an example in which the position of the facility name "AA School" is at "latitude AA degrees north, longitude BB degrees east" is shown, for example. This facility database 16c is used when sorting the contents of the address book table 16a into the various categories based on the positions contained in the measured value storage table 16b. The contents of this facility database 16c may be input by the user, downloaded via the mobile telephone network 100, or pre-registered at the point of manufacture of the mobile telephone terminal 10. For example, it is more appropriate for the user of the mobile telephone terminal 10 to input the contents himself or herself in the case of user's own home, workplace or child's school, but it is more convenient for the contents to be downloaded or pre-registered in the mobile telephone terminal 10 in the case of public facilities or the like.

In various embodiments, one or more programs may be written in advance into the ROM of the control unit 11 at the manufacturing stage of the mobile telephone terminal 10. Hereinafter, these will be called "preinstalled programs". These preinstalled programs include, for example, a multi-task operating system (hereinafter, "multitask OS"), a Java® platform, and a native application. The multitask OS is an operating system that supports various functions such as the allocation of virtual memory space required for realizing pseudo parallel execution of multiple tasks by a TSS (Time-Sharing System). The Java® platform is a group of programs written in accordance with a CDC (Connected Device Configuration), which is a configuration for realizing a Java Runtime Environment 214 (described below) in a mobile device equipped with a multitask OS. A native application is a program for realizing basic services of the mobile telephone terminal 10 such as making calls and transmitting and receiving e-mail messages.

In contrast to a ROM configuration such as the above, in one embodiment, the storage unit 16 has a JAVA application storage area for storing Java applications. These JAVA applications have JAR (Java Archive) files that conjugate substantive programs describing the actual procedures of processing on the Java Runtime Environment, and image files and voice files that are used following the execution of these substantive programs, and ADFs (Application Descriptor Files) that describe the installation and running of these JAR files and various types of attributes. Java applications are created by a content provider or a communications carrier of the mobile telephone network 100, and stored in Internet server apparatuses or the like. Java applications are also downloaded to the mobile telephone terminal 10 from these server apparatuses, in response to a request from the mobile telephone terminal 10.

As shown in FIG. 6, in the mobile telephone terminal 10, a call application program 212 and the Java Runtime Environment 214 are implemented on an OS 211. The call application program 212 is a native application pre-stored in the storage unit 16, and administers incoming and outgoing calls and functions such as exchange of voice signals. The Java Runtime Environment 214 is implemented by a Java platform stored in ROM. The Java Runtime Environment 214 is composed of a class library 217, a JVM (Java Virtual Machine) 218, and a JAM (Java Application Manager) 219. The class library 217 incorporates a group of program modules (classes) having a specific function in a single file. The JVM 218 is a Java Runtime Environment optimized for the above-mentioned CDC, and has a function of interpreting and executing byte code provided as Java applications. This JVM is also called a CVM (Compact Virtual Machine). The JAM 219 has a function of managing the downloading and installation, and the running and termination of Java applications. This JAM is also called an AMS (Application Management System).

Also, a first storage 215 and a second storage 216 are provided in the storage unit 16. The first storage 215 is an area for storing Java applications (JAR files and ADFs) downloaded under the control of the JAM 219. The second storage 216 is an area for storing data generated when a Java application is executed, after termination of the Java application, and separate storage areas are allocated for each installed Java applications. Data in the storage area allocated to a given Java application is only rewritable while that Java application is being executed, and cannot be rewritten by a different Java application.

The address book management application program 213 is a program that administers the management of the abovementioned address book table 16a. This address book management application program 213 may, as shown by the dotted lines in FIG. 6, be a preinstalled program stored in ROM, or a Java application program realized on the Java Runtime Environment 214. In either case, the mobile telephone terminal 10 is configured such that the address book management application program 213 and the call application program can be executed in parallel on the multitask OS. The configuration of the present embodiment is as described above.

In one embodiment, a particular mobile telephone terminal 10 (e.g., mobile telephone terminal 10-1) determines the position of other mobile telephone terminals 10 (e.g., mobile telephone terminals 10-2, 10-3), and further determines the distances to those mobile telephone terminals 10 (e.g., mobile telephone terminals 10-2, 10-3).

Figure 7:
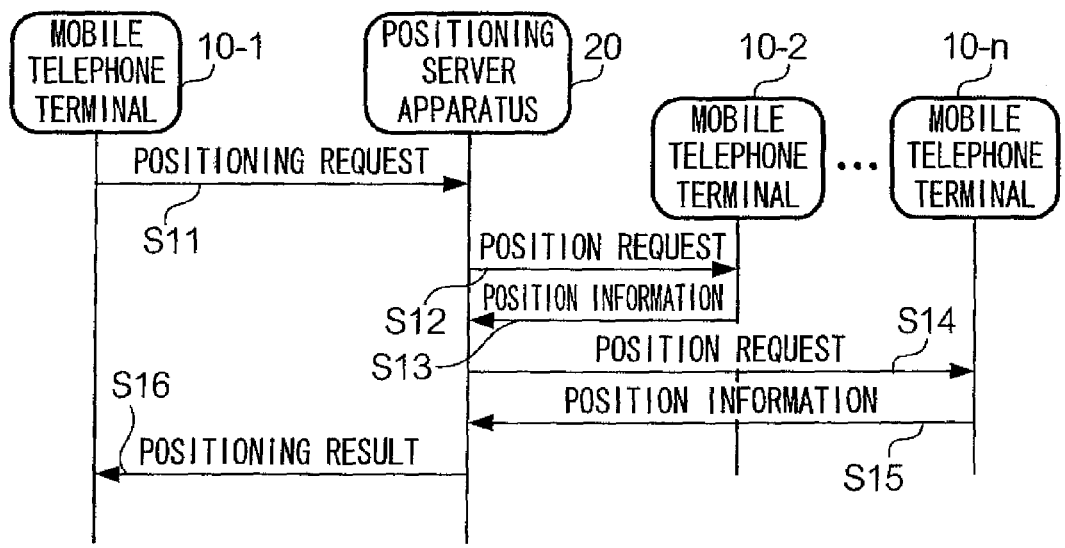
FIG. 7 is a sequence diagram showing processing executed in the system.

In the sequence of a particular embodiment shown in FIG. 7, the control unit 11 of the mobile telephone terminal 10-1 transmits a positioning request to the positioning server apparatus 20 via the mobile telephone network 100 periodically, such as every four hours, for example (step S11). This positioning request includes the telephone number of the requesting mobile telephone terminal 10-1 and the telephone numbers of the positioning target mobile telephone terminals (mobile telephone terminals 10-2, 10-3). Because the telephone numbers of the positioning target mobile telephone terminals 10-2 and 10-3 are contained in the address book table 16a of the mobile telephone terminal 10-1, the control unit 11 needs to only read out these telephone numbers and transmit the read telephone numbers to the positioning server apparatus 20 together with its own telephone number.

The positioning server apparatus 20, on receiving this positioning request, firstly contacts the mobile telephone terminal 10-2 using a telephone number included in the positioning request, and requests a position (step S12). The control unit 11 of the mobile telephone terminal 10-2, in response to this position request, measures its own position using its own positioning unit 17, and transmits the position information obtained as a result to the positioning server apparatus 20 (step S13). In this case, the control unit 11 of the mobile telephone terminal 10-2 may periodically measure and store its own position using the positioning unit 17, and transmit the position information stored at that time to the positioning server apparatus 20. Similarly, the positioning server apparatus 20 contacts the mobile telephone terminal 10-3 using a telephone number included in the positioning request, and requests a position (step S14). The control unit 11 of the mobile telephone terminal 10-3, similarly to the mobile telephone terminal 10-2, transmits position information to the positioning server apparatus 20 in response to this position request (step S15).

Next, the positioning server apparatus 20 associates the position information transmitted from the positioning target mobile telephone terminals 10-2 and 10-3 with the telephone numbers of the mobile telephone terminals 10-2 and 10-3, and transmits this information to the mobile telephone terminal 10-1 as the positioning result (step S16). The mobile telephone terminal 10-1, on receiving the positioning result, writes the contents of the result to the measured value storage table 16b. Further, the mobile telephone terminal 10-1 measures its own position using the positioning unit 17, computes the distances from that position to the positions of the mobile telephone terminals 10-2 and 10-3 stored in the measured value storage table 16*b*, and writes the computed distances to the measured value storage table 16*b* in correspondence with the measurement dates/times.

Figure 8:
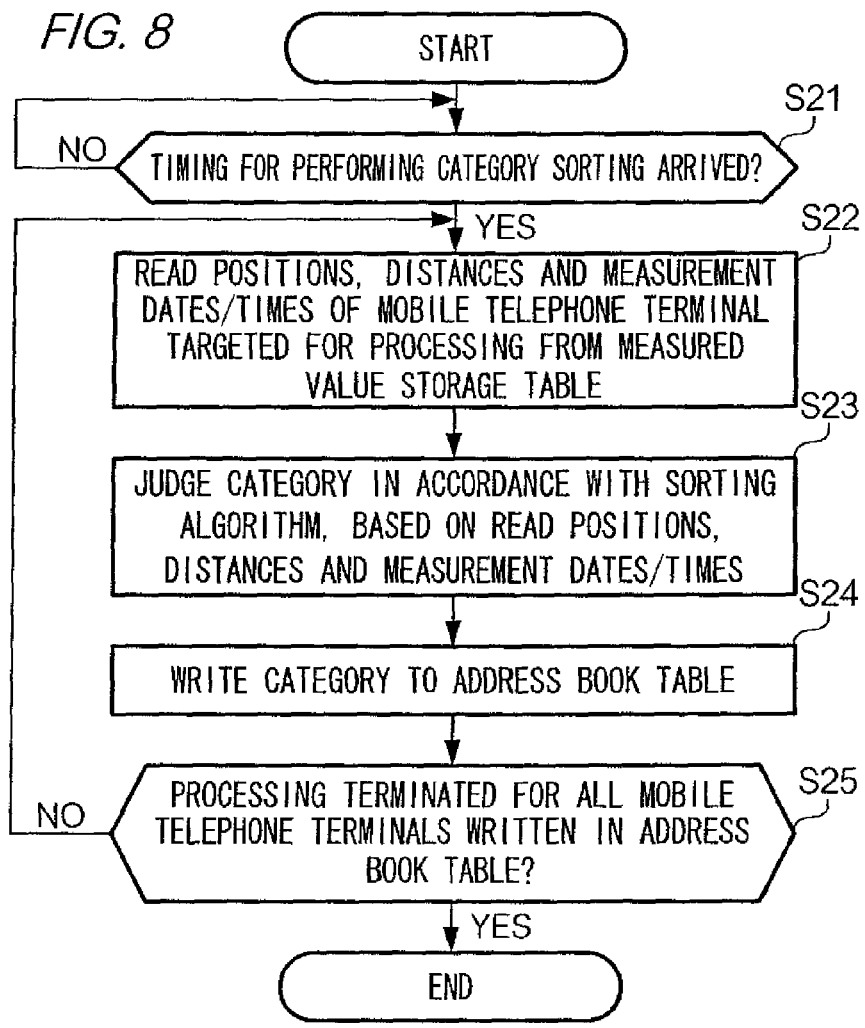
FIG. 8 is a flowchart showing processing executed by the mobile telephone terminal.

One embodiment of an operation in which the mobile telephone terminal 10 sorts the contents of the address book table 16*a* by category is indicated by FIG. 8.

As shown by FIG. 8, the control unit 11 judges whether timing scheduled time at which to perform category sorting has arrived (step S21). Categories sorting may, for example, be scheduled periodically, for example, daily, or a timing arbitrarily designated by the user. The control unit 11, on judging that a time at which to perform category sorting has arrived (step S21:Yes), reads out the positions, distances and measurement dates/times of a single mobile telephone terminal 10 forming a processing target from the measured value storage table 16*b* (step S22). Describing the example in FIG. 4, for example, the control unit 11 reads out all of the "positions", "distances" and "measurement dates/times" corresponding to the record of the telephone number "090-1111-1111" at the top. The control unit 11 then judges the appropriate category, in accordance with a predetermined sorting algorithm, based on the read positions, distances and measurement dates/times (step S23).

Figure 9:
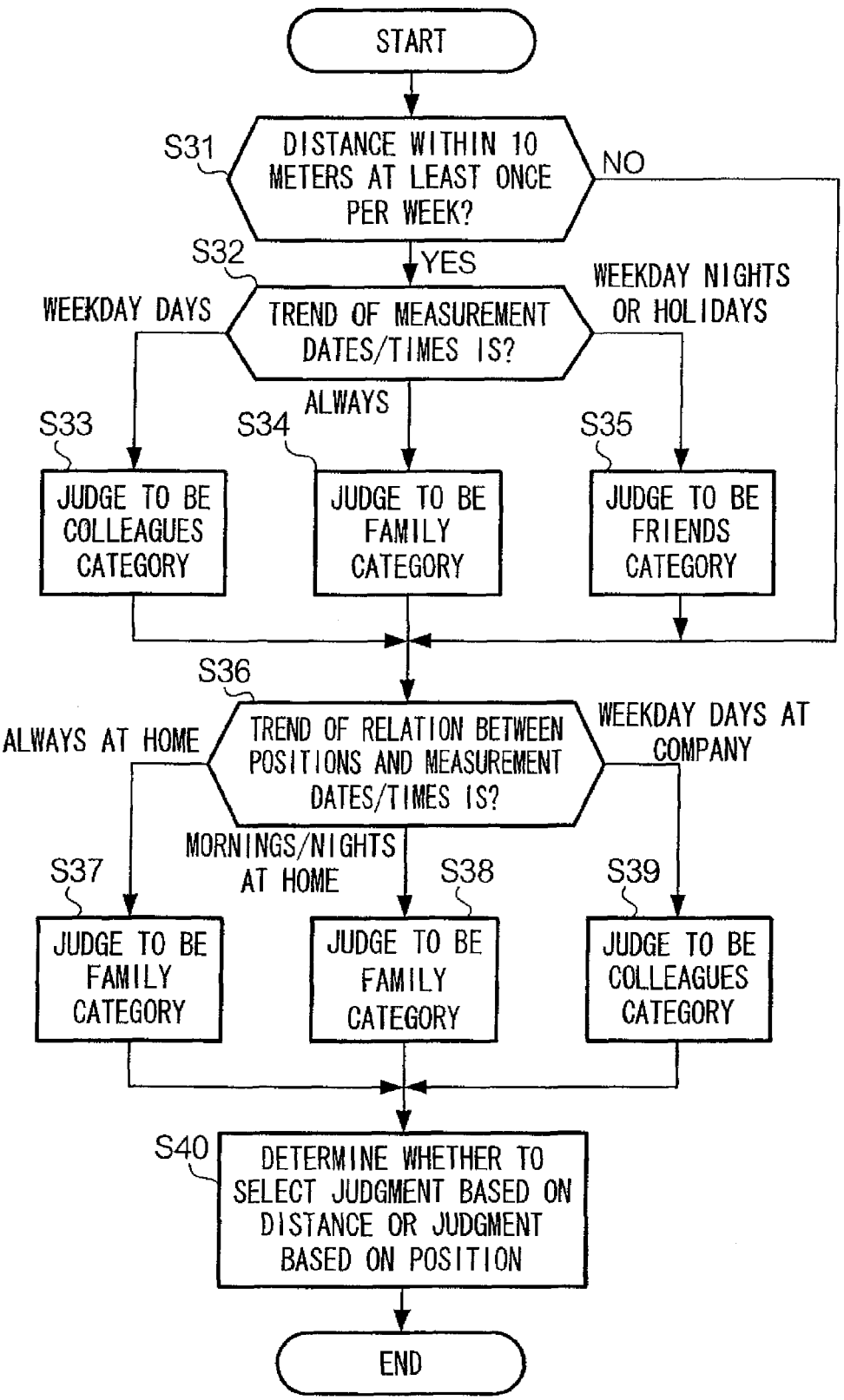
FIG. 9 is a flowchart showing processing executed by the mobile telephone terminal.

One embodiment of a specific example of a sorting algorithm is depicted to the flowchart in FIG. 9.

According to the embodiment, the control unit 11 judges whether the read distances are within 10 meters at a frequency of at least once per week (i.e., that both mobile telephone terminals 10 are in fairly close proximity (step S31)). If the mobile telephone terminals 10 have been this close to one another (step S31:Yes), the control unit 11 judges the trend of the dates/times when the mobile telephone terminals 10 are in close proximity (step S32). For example, in the case where the mobile telephone terminals 10 are often in close proximity during weekday days (step S32: weekday days), this implies that the users are undertaking a social activity together (e.g., they belong to the same company in the case of employed persons), and the control unit 11 therefore judges the appropriate category to be the "colleagues" category (step S33). Also, in the case where the mobile telephone terminals 10 are often in a state of being constantly in close proximity or are in close proximity on weekday mornings and nights and on holidays (step S32: constantly), the control unit 11 judges the users to be family, which is the most intimate form of existence, and judges the appropriate category to be the "family" category (step S34). Also, in the case where the mobile telephone terminals 10 are in close proximity on weekday nights and holidays (step S32: weekday nights or holidays), the control unit 11 judges the users to be in a relationship where they spend their free time together, and judges the appropriate category to be the "friends" category (step S35).

Here, "a state of being constantly in close proximity" need only be a state where the distance between the mobile telephone terminals 10 is within 10 meters for at least a threshold value (e.g., three or more times), out of the abovementioned measurements every four hours, or in other words, six measurements per day. Also, in the case of the measurements every four hours being, for example, at 0:00 hrs (24:00 hrs), 4:00 hrs, 8:00 hrs, 12:00 hrs, 16:00 hrs and 20:00 hrs, the measurements at 4:00 hrs and 8:00 hrs are deemed to be "morning" measurements, the measurements at 12:00 hrs and 16:00 hrs are deemed to be "afternoon" measurements, and the measurements at 20:00 hrs and 0:00 hrs (24:00 hrs) are deemed to be "night" measurements. The control unit 11 may then judge that the mobile telephone terminals 10 are in a state of being constantly in close proximity if the distance therebetween is within 10 meters at least once in all of the morning, afternoon and night timeslots. Also, by specifying, separately for weekdays and holidays, in which of the morning, afternoon and night timeslots the distance therebetween was often within 10 meters, is also able to judge that the users are, for example, often in close proximity on weekday mornings and nights and on holidays.

Next, the control unit 11 judges the trend of the relation between the positions and the measurement dates/times (step S36). At this time, the control unit 11 compares the positions contained in the measured value storage table 16*b* with the positions of facilities, with reference to the aforementioned facility database 16*c*, and performs the above judgment, taking into consideration what types of facilities the positions contained in the measured value storage table 16*b* correspond to. For example, in the case where time is always spent at "home" (step S36: always at home), the control unit 11 judges the category to be "family" (step S37). Also, in the case where mornings and nights are spent at "home" and days are spent at a given facility such as a "school" (step S36: mornings/nights at home), the control unit 11 judges the category to be "family" (step S38). Also, in the case where weekday days are often spent at a "company" (step S36: weekday days at company), the control unit 11 judges the category to be "colleagues" (step S39). Apart from these, it is also possible, for example, to judge the category to be "teacher", or "friend of child", for a user who is frequency at a school. Note that there are also cases in which the control unit 11 is unable to appropriately judge the contents of the address book table 16*a* using the abovementioned algorithm, in which case the contents need only be sorted into a category that is not biased toward a specific quality or type, such as an "other" category, for example.

Finally, the control unit 11 decides which of the categories derived as described above based respectively on distance and position to select (step S40). For example, if the category judged based on distance coincides with the category judged based on position, the control unit 11 need only directly employ that category. On the other hand, in the case where the category judged based on distance does not coincide with the category judged based on position, the control unit 11 decides the eventual category based on judgment certainty. One method at this time is to prioritize "position". For example, the category may be determined to be "colleague" by prioritizing "position", in a case such as where the "position" is always "company", despite the category being judged to be "family" given that the users are often in a state of relatively close proximity, when judged based on "distance". Also, the user may, using the operation unit 15, designate which of the judgments based respectively on distance and position to prioritize.

Let us return again to the description of FIG. 8. The control unit 11 writes the category determined as described above to the address book table 16*a* (step S24). The control unit 11 then judges whether processing with regard to all of the telephone numbers contained in the address book table 16*a* has been terminated (step S25). If there are still telephone numbers targeted for processing (step S25: No), the control unit 11 returns to step S22, and repeats the abovementioned processing of step S22 to step S25 for the mobile telephone terminal 10 to which the next telephone number is allocated. On the other hand, if processing has been completed for the mobile telephone terminals 10 of all of the telephone numbers (step S25: Yes), the processing of the control unit 11 ends.

Operation in the case where the address book is displayed after category sorting as described above has ended is as follows.

Figure 10:
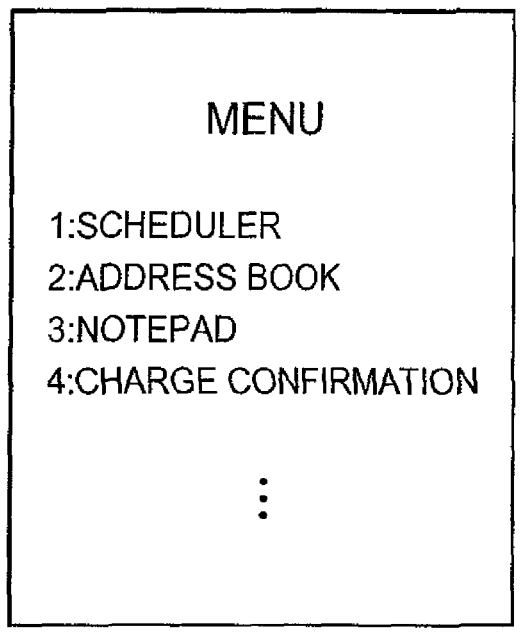
FIG. 10 shows an example of content displayed by the mobile telephone terminal.
Figure 11:
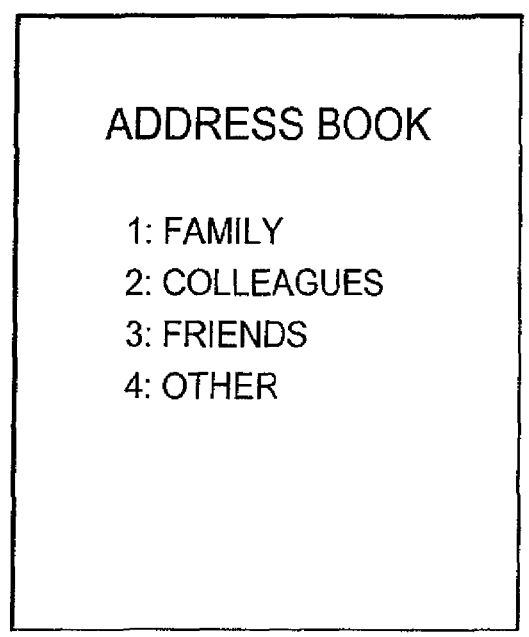
FIG. 11 shows an example of content displayed by the mobile telephone terminal.

When the user performs a prescribed operation using the operation unit 15 and instructs menu display, the control unit 11 displays a menu window such as shown in FIG. 10 on the display 14. The various types of functions of the mobile telephone terminal 10, such as "scheduler", "address book", "notepad", and "charge confirmation", are listed on this menu window. When the user selects "address book" on this menu window, the control unit 11 reads out all of the names of the categories from the address book table 16*a*, and displays a window listing the names of the categories, such as "family", "colleagues", "friends", and "other", on the display 14, as shown in FIG. 11.

Here, when the user selects "colleagues", the control unit 11 reads out the names corresponding to the colleagues category from the address book table 16*a*, and display a window listing the names belonging to the "colleagues" category on the display 14, as shown FIG. 12. When the user selects "Taro Yamada", for example, the control unit 11 reads out the telephone number corresponding to the name "Taro Yamada" from the address book table 16*a*, and displays a window that includes the name "Taro Yamada" and the telephone number "090-1111-1111" thereof on the display 14 as shown in FIG. 13. Here, when the user selects "Outgoing Call", the control unit 11 performs an outgoing call process based on the telephone number "090-1111-1111".

According to the abovementioned exemplary embodiment, the personal relationship between users is inferred based on the distance between mobile telephone terminals and the measurement date/time thereof, or the position of the callee's mobile telephone terminal and the measurement date/time thereof, and the contents of an address book table are sorted by category based on these inference results. Therefore, the contents of an address book table can be sorted by category, without the user performing complicated operations.

In the foregoing embodiment, is an example of the case where mobile telephone terminals having a call function are used as communication terminals. However, the present invention is not limited in this regard, and in other embodiments, the invention can be embodied with communication terminals that do not have a call function, such as PDAs (Personal Digital Assistants) and mobile computers provided with a wireless data communication function, for example. In this case, the communication addresses registered in the address book table will be communication addresses for exchanging text messages such as e-mail addresses, for example, rather than telephone numbers for calling. Also, the communication means of the communication terminals is not limited to being wireless, and may be wired. Therefore, the present invention can also be applied to communication terminals such as personal computers or land-line telephones connected by cable to a communication network.

In various embodiments, the contents registered in the address book table may include not only identification names and communication addresses but also various types of attributes such as the addresses and birthdays of users, and various types of information such as still images for displaying on the display 14 when an incoming call is received.

Also, the function of storing communication addresses allocated to communication terminals in pairs with identification names for identifying users of the communication terminals is not limited to only a so-called address book function. For example, telephone terminals have functions of storing incoming call histories and outgoing call histories, and these functions can also store communication addresses allocated to communication terminals in pairs with identification names for identifying users of the communication terminals. Therefore, even with regard to such incoming call histories and outgoing call histories, the pairs of identification names and communication addresses may be sorted by category, and these pairs may be displayed by category, similarly to the exemplary embodiment. Also, in the telephone terminals, operations such as registering telephone numbers included in the incoming call histories and outgoing call histories in the address book are also possible. In this case, category sorting such as the above may be performed even with respect to the telephone numbers included in the incoming call histories and outgoing call histories (telephone numbers not yet registered in the address book table). The user may then be prompted to register the telephone numbers in the sorted categories.

The contents of the sorting algorithms are not limited to those described in the exemplary embodiment. For example, in the exemplary embodiment, users were judged to be in close proximity in the case where communication terminals were within a distance of 10 meters at a frequency of at least once per week, but the invention is not limited in this regard and in other embodiments, the parameters of the period, frequency and distance forming the judgment criteria as to whether users are in close proximity can be increased or decreased. Thus, in some embodiments, the users may be judged to be in close proximity, in the case where communication terminals are within a prescribed distance from one another at a frequency of at least a prescribed number of times within a prescribed period. Also, personal relationships may be inferred based on the frequency or number of times communication terminals are away from one another, rather than being limited only to when they are in close proximity, and this may be reflected in the category sorting.

Also, in the exemplary embodiment, categories are respectively sorted based on distance and measurement date/time and position and measurement date/time, and one of the categories is ultimately selected, but the present invention is not limited to this method.

For example, the categories may be sorted based only on distance and measurement date/time or only on position and measurement date/time. Also, in the exemplary embodiment, the categories are sorted while taking measurement date/time into consideration in addition to distance or position, but measurement date/time is only taken into consideration to enable more accurate category sorting, and this measurement date/time is not essential. Therefore, categories may be sorted based only on distance or based only on position. For example, when sorting is based only on distance, users may be sorted into the "family" category in the case where there is a high frequency of being in close proximity, and when sorting is based only on position, users may be sorted into the "family" category in the case where there is a high frequency of being at home.

In the exemplary embodiment, description is given using the expression "sorting categories based on distance and measurement date/time and position and measurement date/time", but the measurement dates/times on which measurement is performed continuously every prescribed period can also be viewed as a "measurement period". In short, in the present invention, measurement date/time or measurement period may be used as material for judging in the category sorting.

Also, because the categories decided by the mobile telephone terminal 10 are not always accurate, the present invention may be configured such that the user is able to appropriately correct or change the contents sorted by category. In this case, the control unit 11 rewrites categories to which the communication addresses and identification names belong in the address book table 16*a*, in accordance with an operation of the user received in the operation unit 15. The control unit 11 is configured not to perform category sorting based on position or distance with regard to categories that have been changed or corrected in this way. This is because the control unit 11 changing a result arbitrarily sorted by the user himself or herself would not be in line with the intent of the user, and is not considered preferable.

Also, in the exemplary embodiment, description was only given with regard to the sorting of categories, but the result of inferring personal relationships based on position or distance may be reflected in the display order of the individual categories. For example, a user with a particularly high frequency of being in close proximity in the "colleagues" category may be displayed in a prominent position in that "colleagues" category, such as at the head of the category. In other words, users are displayed in prominent positions by raising the display priority ranking, the smaller the average value of measured distances. Conversely, an approach can also be taken whereby the display priority ranking is raised, the larger the average value of measured distances. The thinking here is that because the average value of measured distances is large, or in other words, because the distance between the two users is great, normally there would be little opportunity for direct conversation, so display should be preferentially performed in the address book display when making a call. In this case, the control unit 11 determines, in each of the categories, the priority rankings for when causing the display 14 to display identification names, based on position or distance, and writes the priority rankings to the address book table 16*a*. When displaying the address book, the control unit 11 displays the identification names in accordance with the priority rankings contained in the address book table 16*a*.

The address book table 16*a* is not limited to being stored in a communication terminal (mobile telephone terminal 10 in the exemplary embodiment) belonging to or used by a user. For example, a configuration in which an information management apparatus on a network retains an address book table, and a communication terminal acquires and displays the contents of the address book table from this information management apparatus as necessary is also possible. In this case, the above information management apparatus, rather than the mobile telephone terminal 10 of the exemplary embodiment, stores in storage means an address book table in which communication addresses respectively allocated to a plurality of communication terminals are written in pairs with identification names for identifying users of the individual communication terminals. A control unit of this information management apparatus then specifies the positions of communication terminals stored in the storage means, or the distances from the communication terminals to the mobile telephone terminal 10. Further, the control unit sorts the pairs of communication addresses and identification names into a plurality of categories in accordance with a set sorting algorithm, based on the specified positions or distances, and writes the pairs to the address book table for each sorted category. The control unit then transmits the contents of this address book table to the mobile telephone terminal 10, in response to a request from that communication terminal The mobile telephone terminal 10 displays the contents of the address book table received from the information management apparatus by category.

Specific means for specifying the position of a communication terminal or the distance to that communication terminal is not limited to that described in the exemplary embodiment. For example, positioning means for measuring position based on a position registration area or a cell in which the mobile telephone terminal 10 is located, for example, rather than means that uses GPS technology, is acceptable. Note that the position registration area is an area covered by a switching center that performs general invoking in the mobile telephone network 100, and a cell is the area in which base stations can wirelessly communicate. Since a technique of measuring positions based on these position registration areas and cells is already well known, a detailed description thereof will be omitted. Also, in the case where a mobile telephone terminal 10 is provided with near field wireless means such as Bluetooth or infrared, the distance from another mobile telephone terminal 10 can also be approximately specified using this near field wireless means. In this case, a mobile telephone terminal detects that another mobile telephone terminal is in close proximity, due to the fact that that mobile telephone terminal can perform wireless exchange with the other mobile telephone terminal, using this near field wireless means.

In some embodiments, when displaying the contents of the address book table by category, only the identification names (names) are displayed, as shown in FIG. 12. In other embodiments communication addresses (telephone numbers) are displayed in addition to the identification names. In short, at least the identification names, out of the communication addresses and the identification names contained in the address book table, need to be displayed by category.

A computer program executed by the abovementioned control unit 11 can be provided in a state of being recorded on a recording medium such as a magnetic tape, a magnetic disk, a Floppy® disk, an optical recording medium, a magneto-optical recording medium, a CD (Compact Disk), a DVD (Digital Versatile Disk) or a RAM. The computer program can also be downloaded via a network such as a mobile telephone network or the Internet.

The invention claimed is:

1. A mobile communication terminal comprising:
a communication unit that communicates with a plurality of other mobile communication terminals using communication addresses respectively allocated to each of the plurality of other mobile communication terminals;
a memory in the mobile communication terminal that stores one or more pairs of the communication addresses allocated to each of the plurality of other mobile communication terminals with identification names for identifying users of each of the plurality of other mobile communication terminals;
a computer in the mobile communication terminal, the computer configured to:
acquire a first position and at least a second position of the mobile communication terminal at predetermined intervals of time during a day,
acquire a first position and at least a second position of at least one of the plurality of other mobile communication terminals to which the communication addresses stored in the memory are allocated, wherein the first position and the at least second position of the at least one of the plurality of other mobile communication terminals are acquired at the predetermined intervals of time,
compute a distance between the mobile communication terminal and the at least one of the plurality of other mobile communication terminals, the distance computed based on at least one of the positions of the mobile communication terminal and at least one of the positions of the at least one of the plurality of other mobile communication terminals at the predetermined intervals of time;

the computer including a sorting algorithm to categorize the mobile communication terminal into one of a plurality of groups based on the acquired first position and the at least second position of the mobile communication terminal, and to categorize each of the pairs of communication addresses and identification names into the plurality of groups, at least one of the groups being indicative of a relationship between a user of the mobile communication terminal and a user of the at least one of the plurality of other mobile communications terminals, the groups based upon at least one of the positions of the at least one of the plurality of other mobile communication terminals and the distance between the mobile communication terminal and the at least one of the plurality of other mobile communications terminals at the predetermined intervals of time; and a display that displays at least the identification names, out of the communication addresses and identification names stored in the memory, the computer configured to display at least the identification names in association with at least one of the plurality of groups.

2. The mobile communication terminal according to claim 1,
wherein the computer sorts the pairs of communication addresses and identification names into the plurality of groups, based on dates/times on which or periods for which the positions or distances were specified by the computer, in addition to the positions or distances.

3. The mobile communication terminal according to claim 1,
wherein the computer sorts the pairs of communication addresses and identification names into the plurality of groups, and further determines, in each of the groups, a ranking for when the display is caused to display the identification names based on the positions or distances specified by the computer, and
the computer is configured to cause the display to display the identification names in accordance with the ranking determined by the computer, in a case of causing the display to display at least the identification names, out of the communication addresses and identification names stored in the memory, by the groups.

4. The mobile communication terminal according to claim 1,
wherein the computer stores types of facilities installed in a prescribed range in correspondence with positions of the facilities, specifies the types of facilities installed in the positions specified by the computer, by comparing the positions specified by the computer with the positions of the facilities, and sorts the pairs of communication addresses and identification names into a plurality of groups based on the specified types of facilities.

5. The mobile communication terminal according to claim 1, further comprising:
operation means for receiving an operation by a user; and
changing means for changing the group to which a pair of a communication address and an identification name sorted by the computer belong, in accordance with the operation received by the operation means,
wherein the computer does not perform sorting based on the positions or distances specified by the computer, with regard to the pair of the address and the identification name whose group was changed by the changing means.

6. The mobile communication terminal according to claim 1, wherein the predetermined intervals of time are once every four hours.

7. An information management apparatus comprising:
a memory that stores one or more pairs of communication addresses respectively allocated to a plurality of mobile communication terminals with identification names for identifying a user of at least one of the plurality of mobile communication terminals;
a computer in the information management apparatus, the computer configured to:
acquire a first position and at least a second position of the at least one of the plurality of mobile communication terminals at predetermined intervals of time during a day,
acquire a first position and at least a second position of at least another one of the plurality of mobile communication terminals to which the communication addresses stored in the memory are allocated, wherein the first position and the at least second position of the at least one of the plurality of other mobile communication terminals are acquired at the predetermined intervals of time,
compute a distance between the at least one of the plurality of mobile communication terminals and the at least another one of the plurality of mobile communication terminals, the distance computed based on at least one of the positions of the at least one of the plurality of mobile communication terminals and at least one of the positions of the at least another one of the plurality of other mobile communication terminals at the predetermined intervals of time;
the computer including a sorting algorithm to categorize the at least one of the plurality of mobile communication terminals into one of a plurality of groups based on the acquired first position and the at least second position of the at least one of the plurality of mobile communication terminals, and to categorize each of the pairs of communication addresses and identification names into the plurality of groups, at least one of the groups being indicative of a relationship between the user of the at least one of the plurality of mobile communication terminals and a user of the at least another one of the plurality of mobile communications terminals, the groups based upon at least one of the positions of the at least one of the plurality of the mobile communication terminals and the distance between the at least one of the plurality of mobile communications terminals and the at least another one of the plurality of mobile communications terminals at the predetermined intervals of time; and
a display that displays at least the identification names, out of the communication addresses and identification names stored in the memory, the computer configured to display at least the identification names in association with at least one of the plurality of groups.

8. The information management apparatus according to claim 7, wherein the predetermined intervals of time are once every four hours.

9. A computer program product operable with software for causing a computer that uses communication addresses respectively allocated to a plurality of mobile communication terminals to perform communication with at least one prescribed mobile communication terminal to execute the steps of:
causing a memory to store one or more pairs of the communication addresses allocated to each of the plurality of mobile communication terminals with identification names for identifying users of at least one of the plurality of mobile communication terminals;

acquiring a first position and at least a second position of the at least one prescribed mobile communication terminal at predetermined intervals of time during a day;

acquiring a first position and at least a second position of the at least one of the plurality of mobile communication terminals to which the communication addresses stored in the memory are allocated, wherein the first position and the at least second position of the at least one of the plurality of other mobile communication terminals are acquired at the predetermined intervals of time;

computing a distance between the at least one of the plurality of mobile communication terminals and the at least one prescribed mobile communication terminal, the distance computed based on at least one of the positions of the prescribed mobile communication terminal and at least one of the positions of the at least one of the plurality of other mobile communication terminals at the predetermined intervals of time;

categorizing the at least one prescribed mobile communication terminal into one of a plurality of groups based on the acquired first position and at least second position of the at least one prescribed mobile communication terminal;

categorizing each of the pairs of communication addresses and identification names into the plurality of groups, at least one of the groups being indicative of a relationship between a user of the at least one prescribed mobile communication terminal and the user of the at least one of the plurality of mobile communications terminals, the groups based upon at least one of the position of the at least one of the plurality of mobile communication terminals and the distance between the at least one prescribed mobile communication terminal and the at least one of the plurality of mobile communications terminals at the predetermined intervals of time; and causing a display to display at least the identification names, out of the communication addresses and identification names stored in the memory, in association with at least one of the plurality of groups.

10. The computer program product according to claim 9, wherein the predetermined intervals of time are once every four hours.

11. A computer program product operable with software for causing a computer to execute the steps of:

causing a memory to store one or more pairs of communication addresses respectively allocated to a plurality of mobile communication terminals with identification names for identifying a user of at least one of the plurality of mobile communication terminals;

acquiring a first position and at least a second position of the at least one of the plurality of mobile communication terminals to which the communication addresses stored in the memory are allocated, wherein the first position and the at least second position of the at least one of the plurality of mobile communication terminals are acquired at predetermined intervals of time during a day;

acquiring a first position and at least a second position of a prescribed mobile communication terminal at the predetermined intervals of time;

computing distances between the at least one of the plurality of mobile communication terminals and the prescribed mobile communication terminal, the distance computed based on at least one of the positions of the plurality of mobile communication terminals and at least one of the positions of the prescribed mobile communication terminal at the predetermined intervals of time;

categorizing the at least one of the plurality of mobile communication terminals into one of a plurality of groups based on the acquired first position and at least second position of the at least one of the plurality of mobile communication terminals;

categorizing each of the pairs of communication addresses and identification names into the plurality of groups, at least one of the groups being indicative of a relationship between a user of the prescribed mobile communication terminal and the user of the at least one of the plurality of mobile communications terminals, the groups based upon at least one of the position of the at least one of the plurality of mobile communication terminals and the distance between the prescribed mobile communication terminal and at least one of the plurality of mobile communications terminals at the predetermined intervals of time; and causing a display to display at least the identification names, out of the communication addresses and identification names stored in the memory, in association with at least one of the plurality of groups.

12. The computer program product of claim 11, wherein the predetermined intervals of time are once every four hours.

* * * * *